3,405,341
GATE ELECTRODE CONTROLLED BATTERY CHARGER CIRCUIT
Roman Buchowski, now by change of name, Roman Buch, Wheeling, and Louis L. Kocsis, Elmhurst, Ill., assignors to Zenith Radio Corporation, Chicago, Ill., a corporation of Delaware
Filed Nov. 26, 1965, Ser. No. 509,844
7 Claims. (Cl. 320—33)

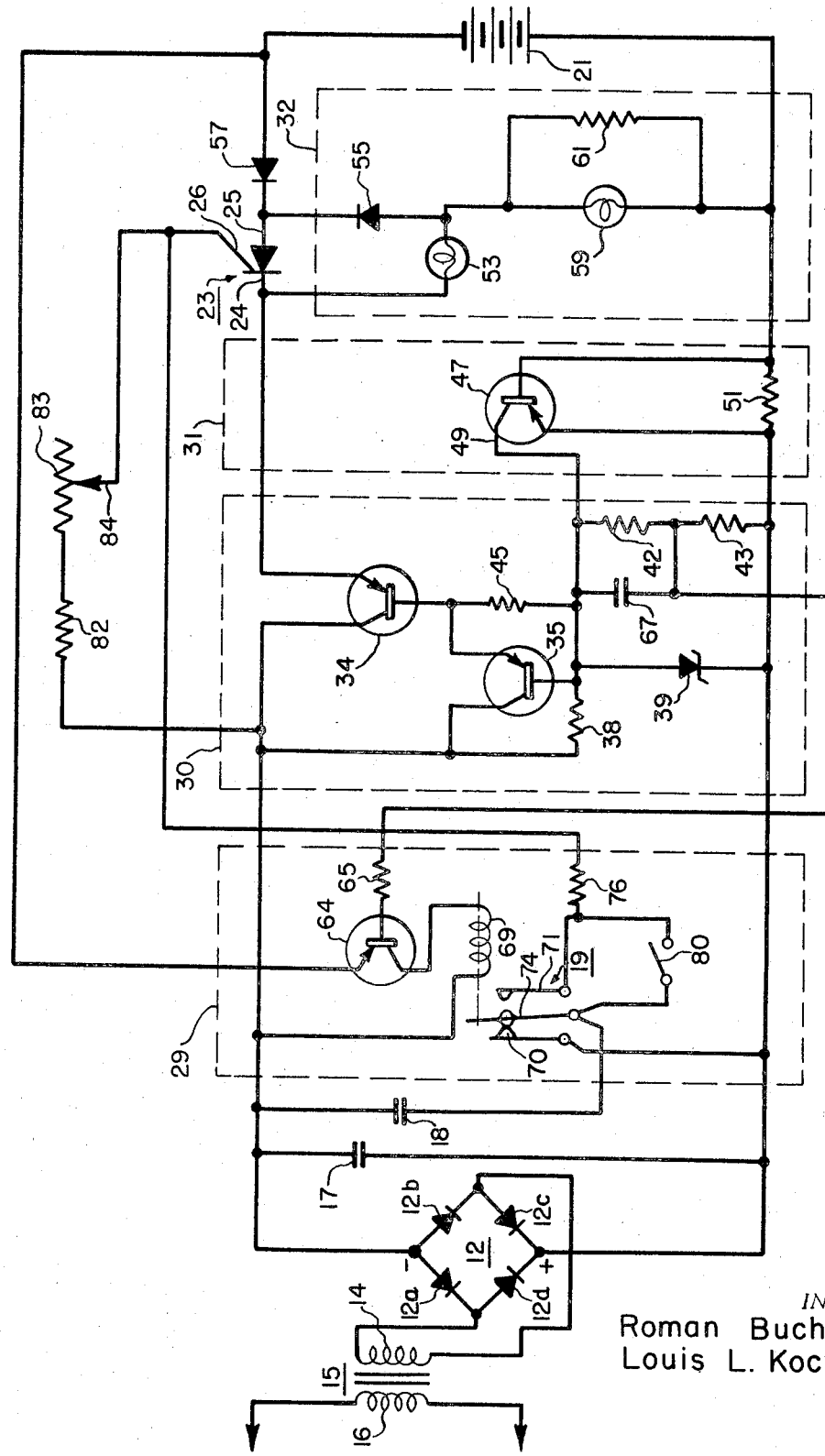
Oct. 8, 1968  ROMAN BUCHOWSKI  3,405,341
NOW BY CHANGE OF NAME ROMAN BUCH ET AL
GATE ELECTRODE CONTROLLED BATTERY CHARGER CIRCUIT
Filed Nov. 26, 1965
INVENTORS
Roman Buchowski
Louis L. Kocsis United States Patent Office 3,405,341
Patented Oct. 8, 1968

ABSTRACT OF THE DISCLOSURE

A system for charging a storage battery from a source of alternating current wherein the charging cycle is accurately terminated as the battery reaches a desired level of charge. A variable DC bias is applied to the gate electrode of an SCR having principal electrodes serially included in the charging circuit for the battery. By varying this bias, the minimum holding current of the SCR, and hence the ultimate level of charge of the battery, is accurately controlled. Triggering means initiate conduction through the SCR upon initial application of alternating current to the system, upon battery terminal voltage falling below a predetermined threshold value, and upon actuation of a manually operated switch. By terminating the charging cycle in response to a selected level of charging current, greatly improved charging accuracy is obtained.

---

The present invention pertains to a device for charging an electrical storage battery, and more particularly, to such a device for precision charging of a battery to its full energy storage capacity and having in addition features especially well suited for association with portable apparatus normally energized from a conventional alternating current source, but capable of remote operation from a self-contained battery supply.

Heretofore, recharging of electrical storage batteries has often involved a good deal of imprecision resulting in either overcharging or undercharging of the battery cells. Of course, the consequences of improper recharging can be quite serious especially with certain modern rechargeable batteries. For instance, overcharging may result in emission of noxious gases from the battery cells, and possibly even destruction of the battery itself while inadequate charging leaves the battery with an undersupply of energy causing unexpectedly short operating periods or unnecessarily deep discharge of the battery during extended operating intervals with consequent reduction in useful battery life. In many present day devices such inexactitude in recharging is an inherency as the control parameter for terminating the charging process is not accurately representative of battery condition. Specifically along these lines, battery voltage during charging is often used as the control parameter, but the characteristics of a number of batteries are such that the rate of change of terminal battery voltage with respect to time is quite small as the terminal voltage approaches its end of charge value, thus making it impossible to reliably terminate the charging process just as the battery reaches a prescribed energy storage condition.

Further, and apart from the above, it is essential in many applications and environments that apparatus, although usually operated from a conventional AC wall source, be immediately ready and capable of reliable operation from a self-contained battery supply. For example, one medical electronic device known as a defibrillator which is used for cessating spasmodic contractions of a human heart is normally maintained in an operating room, etc. of a hospital, but is preferably capable of on the site use to revive victims of heart attacks or drowning. For such emergency life saving purposes, it is absolutely essential that the battery supply operate reliably. To aid in insuring such, it is desirable to provide a battery charger having features for maintaining the battery in a substantially fully charged condition when the defibrillator is used in its normal environment while requiring a minimum amount of expertise and care on the part of the operator to this detail.

Accordingly, it is an object of the present invention to provide a new and improved battery charging device.

It is a further object of the present invention to provide in apparatus adapted for energization from an alternating current or battery source, a battery charger operable with said apparatus and having features adapted for maintaining an associated battery supply in a fully charged condition when the apparatus is powered from the AC source while requiring a minimum degree of attention and skill on the part of the operator with regard to this detail.

It is yet another object of the invention to provide, in a device for recharging a storage battery, means for terminating the charging operation precisely when the battery attains a prescribed energy storage capacity to thereby avoid the undesirable consequences of overcharging or undercharging.

It is a more specific object of the present invention to provide means for varying the point at which battery charging is terminated so as to accommodate the different charging characteristics of various batteries.

It is yet a further object of the invention to provide a battery charger of economical construction which requires minimum technical skill for control of its operation.

In accordance with the invention, a system for charging a storage battery from a source of alternating current to a preselected state of charge comprises rectifying means for developing from the alternating current source a unidirectional charging current. Means comprising a gate-electrode-controlled bi-stable switching device having conductive and non-conductive states are included for applying the unidirectional charging current to the battery, the switching device having a minimum holding current dependent on the bias level of the gate electrodes and conduction being established through the device only in response to the application of a triggering signal in excess of a predetermined threshold value to the gate electrode. Triggering means coupled between the storage battery and the gate electrode and responsive to the terminal voltage of the battery are included to apply a triggering signal in excess of the threshold value to the gate electrode to initiate conduction between the principal electrodes only when the battery terminal voltage recedes below a preselected value. Further included are means for applying a variable direct current bias to the gate electrode to establish the minimum holding current of the switching device at any desired value within a predetermined range to permit preselection of the level to which the storage battery will be charged.

In accordance with further facets of the invention, additional means are provided for visually indicating that the battery is fully charged or that recharging is taking place.

The features of the present invention which are believed to be novel are set forth with particularity in the appended claims. The invention, together with further objects and advantages thereof, may best be understood by reference to the following description taken in connection with the accompanying drawing, the single figure of which illustrates a preferred embodiment of the invention.

Referring now to the drawing, the charging device of the invention comprises rectifying means consisting of a bridge type rectifier 12 having silicon diodes 12a, 12b, 12c and 12d connected in the respective legs of the bridge network in conventional fashion. A secondary winding 14 of a step-down transformer 15 is connected to one pair of diagonally opposite input terminals of bridge 12 while a primary winding 16 of transformer 15 is adapted for connection to an ordinary 115 volt alternating current power source or the like, not shown. The remaining diagonally opposite terminal pair of bridge 12, labeled "minus" and "plus" in the drawing, are shunted by filter means comprising a capacitor 17 and a second shunt capacitor 18 which, for reasons to be explained, is connected in series with a normally closed contact pair of a relay 19. The output terminals of bridge 12 are also ultimately coupled in series with an electrical storage battery 21 which is to be recharged from the direct current electrical energy developed across rectifier bridge 12 and filter capacitors 17, 18.

To control the charging of battery 21 in the manner contemplated by the invention, there is included in the series charging circuit switch means 23. Preferably means 23 is a silicon controlled rectifier comprising a pair of principal electrodes, namely a cathode 24 and an anode 25, coupled in the series charging path, and having a control or gate electrode 26. As is well-known in the art, controlled rectifier 23 is a gate actuated bistable device having a conductive and a nonconductive state, being normally nonconductive in the absence of a forward bias across the principal electrodes and a coincident gating or triggering pulse at electrode 26. Once conduction is established between principal electrodes 24, 25, gate electrode 26 is thereafter ineffective and the device remains in its conductive state until and unless the current between the principal electrodes recedes below a predetermined holding current value.

In accordance with further aspects of the invention, the charging circuit additionally comprises several operatively independent triggering or battery recharge initiating mechanisms, shown generally within dashed outline 29, for controlled rectifier 23 and a voltage regulating circuit, a current limiting mechanism, and an indicator circuit each indicated generally in the drawing by respective dashed blocks 30, 31 and 32.

Specifically, regulator 30 consists of two PNP voltage regulating transistor 34 and 35 coupled in the fashion of a Darlington pair and having their common collector junctions returned to the negative terminal of bridge 12. The base of transistor 35 is coupled to its collector electrode by a resistor 38 and to the common junction of the base of transistor 34 and emitter of transistor 35 by a resistance 45. The base electrode of transistor 35 is also returned to the positive terminal of bridge 12 through the parallel combination of a Zener diode 39 and series voltage divider resistors 42, 43.

The current limiting mechanism shown in block 31 includes a normally nonconductive transistor 47 of the PNP type having its collector 49 coupled to the base of transistor 35. The emitter and base electrodes of transistor 47 are connected across a current sensing resistor 51 which is in the series charging path between the positive terminals of battery 21 and rectifier bridge 12.

Indicating circuit 32 comprises a first indicator bulb 53 series coupled through a diode 55 to the anode of controlled rectifier 23. Diode 55 is poled to preclude charging current from shunting controlled rectifier 23, however, if desired diode 55 may be replaced by a resistor to permit continuous "trickle charging" of the battery. A blocking diode 57, preventing discharge of the battery through the charging circuit, is series coupled with the principal electrodes of controlled rectifier 23 and is similarly poled. The common junction of rectifier 55 and bulb 53 is returned to the positive terminal of battery 21 by a second indicator lamp 59 shunted by a resistor 61.

Initiation of a charging current for battery 21 is accomplished by applying an appropriate triggering signal to gate electrode 26 of controlled rectifier 23, and the several operatively independent means for accomplishing this end are contained within block 29. More particularly, there is contained in block 29 a PNP control transistor 64 having its emitter electrode connected to the negative terminal of battery 21 while the base of transistor 64 is connected via a coupling resistor 65 to a constant reference potential at the center junction of voltage divider resistors 42, 43. A capacitor 67 shunts resistor 42 and provides a transient low impedance path from the anode of Zener 39 to the base of transistor 64 upon each initial energization of the charging device from the source of alternating current power. The collector circuit of transistor 64 comprises a coil 69 for relay 19 which is returned to the negative terminal of rectifier bridge 12. Relay 19 also includes a pair of fixed contacts 70 and 71 and a movable armature 74 normally engaging contact 70. Fixed contact 71 of relay 19 is coupled to gate electrode 26 of silicon controlled rectifier 23 by a series resistor 76 and a normally open manually actuatable switch 80 shunting contacts 71, 74 of relay 19. Electrode 26 of rectifier 23 also receives an adjustable DC bias from the negative terminal of bridge 12 through a series combination of a resistor 82 and a potentiometer 83 having a movable tap 84.

Assuming for the moment steady state operating conditions, the operation of the circuit may be explained as follows. The 115 volt alternating current signal developed across primary winding 16 of transformer 15 from the energizing source, not shown, is stepped-down to 24 volts or the like across secondary winding 14. A full-wave rectified output is developed between the "plus" and "minus" terminals of rectifier bridge 12 and filtered by capacitors 17, 18 to provide direct current energy of a reasonably uniform predetermined potential for application to battery 21 through controlled rectifier switch 23 during a recharge operation. Although not essential for many applications, further filtering and voltage control is provided by voltage regulator 30 which includes, as previously mentioned, a pair of control transistors 34, 35 functioning as a well-known Darlington pair. Specifically, a constant charging voltage substantially independent of the charging current drawn by battery 21 is attained by the varying conductivity of transistor 34 which is controlled in accordance with the base current drawn by signal multiplying transistor 35. The base current of transistor 35 is, of course, in turn related to the load presented by battery 21. The base of transistor 35 is further normally maintained at a substantially constant reference potential independent of current drawn by it or the battery load by Zener diode 39.

To preclude excessive current demands of the load or short circuiting thereof from damaging the charging device, a current limiting transistor 47 is provided with a low impedance current sensing resistor 51 coupled in the series charging path. Transistor 47 is normally nonconductive, but is gradually biased into conduction as the charging current through resistor 51 exceeds a predetermined amplitude. This action shunts Zener 39 to reduce the base bias of transistor 35 which in turn exercises a like control over regulator transistor 34 to limit the charging current therethrough to a prescribed magnitude.

Charging of battery 21 from the series energy source is effected by the triggering of silicon controlled rectifier 23 into its conductive state. This may be accomplished, in accordance with the invention in one of three ways, transistor 64 being of importance with regard to two of these mechanisms. Transistor 64 is normally nonconductive when battery 21 displays proper terminal voltage by virtue of a reverse bias voltage applied between its base-emitter electrodes. This reverse bias voltage is derived from the connection of the emitter of this transistor to the negative terminal of the battery and the application of a less negative reference potential to the transistor base electrode from the center tap of voltage divider 42, 43 connected in parallel with Zener 39. A predetermined increase in potential of the emitter of transistor 64, reflecting a reduction of terminal battery voltage below a preselected value, initiates conduction of the transistor to an extent sufficient to energize relay coil 69 thereby shifting movable armature 74 from fixed relay contact 70 to the remaining fixed contact 71 and connecting the high potential terminal of capacitor 18 to gate electrode 26 through resistor 76. Relay armature 74 may continue to engage fixed contact 71 until the voltage level of battery 21 is raised to an extent sufficient to again cut-off transistor 64, however, such is not necessary and the relay may be so constructed as to return armature 74 to fixed contact 70 after a brief engagement with contact 71. As will be remembered, a brief gating pulse is adequate to initiate conduction between principle electrodes 24, 25 of device 23.

A second triggering means automatically initiates conduction of device 23 on initial application of energy to the charging device from the alternating current power source. To maximize the utility of this triggering means, it is contemplated that the battery charger form an integral part of the apparatus to be powered by the battery supply, and that the charger necessarily be turned on with the principal apparatus each time this apparatus is operated from a conventional AC wall outlet. Thus, a frequent automatic check is made of the battery charge condition which is independent of the terminal battery voltage. This is a desirable feature both because dependency on the operator for attending to recharging is to a large extent avoided and also because the battery voltage indication upon which the first triggering means depends for its operation is not, as previously discussed, truly representative of the amount of energy still held by the battery. The first mechanism does, however, serve the important function of initiating recharge automatically regardless of whether the apparatus is periodically turned off and on.

Specifically, this second triggering source for controlled rectifier 23 makes use of a capacitor 67 which shunts voltage divider resistor 42 and is coupled to the base electrode of transistor 64. On initial application of energy to the circuit, capacitor 67 is a transient shunt for resistor 42 and applies a signal to the base of transistor 64 adequate to cause conduction thereof and operation of relay 19. The time constants of the charger are such, however, that capacitor 18 is already adequately charged to apply an appropriate gate signal to electrode 26 of switch 23.

A third triggering mechanism comprising a normally open manually actuatable switch 80 which shunts contact 71, 74 of relay 19 permits the operator to manually initiate charging of the battery independent of the automatic first and second triggering mechanism.

As previously discussed, gate electrode 26 of device 23 is effective only to initiate conduction between the principal electrodes 24, 25 and conduction is maintained therebetween, independent of the gate potential, until the current between these electrodes falls below a predetermined level characteristic of the particular device. The circuit of the invention utilizes this inherent characteristic of switch means 23 to considerable advantage. Specifically, and unlike prior art charging circuits employing silicon controlled rectifiers or similar devices which conventionally effect charging only on the peaks of the rectified current and which require the continued presence or periodic application of a gate signal to sustain charging, the rectifying means herein is followed by filter means developing electrical energy of a sufficiently uniform potential to permit continuous application of a unidirectional charging current through the switch means to the battery during recharge. Thus, once conduction of device 23 is initiated conduction continues until the increasing impedance of battery 21 during recharge attains a value such that the net current through device 23 recedes below its holding current level, at which time the device reverts to its nonconductive state. Since the holding current for switch 23 is normally quite small, for example 10 milliamperes, and since the current parameter is a very reliable indication of battery charge level, the circuit of the invention permits precision charging of the storage battery to its full energy storage capacity.

The above description contemplates that the charging source be capable of developing an approximately uniform potential to apply a continuous charging current for the entire recharging period, but such is not essential to reap the benefits of the invention. Specifically, the invention may also be practiced by applying a continuous charging current to the battery only during the latter portion of the recharge operation. In this mode, the filter means may be relatively simple and comprise a single capacitor having an energy storage capacity adequate to sustain a relatively uniform charging potential only during the low current, final portion of the recharge operation. Recharging on the rectified current peaks is experienced during the initial portion of recharge when battery current demands are high. This manner of operation is satisfactory and within the teachings of the invention as recharging is still terminated in accordance with the charging current parameter. It is, of course, understood that with the last described manner of operation a gating signal need be applied to controlled rectifier 23 throughout the initial charging period to recurrently establish conduction therein. Thus, the phrase "for continuously applying a unidirectional charging current to said battery for at least the terminal portion of any recharge operation" used in the appended claims is intended to embrace both above described modes of operation.

It has also been found that the holding current below which device 23 becomes nonconductive is increased with an increasingly negative gate bias with respect to cathode 24. Accordingly, series resistor 82 and potentiometer 83 deliver an adjustable negative bias to gate electrode 26 to this end thereby permitting termination of recharge at various current levels.

Further in accordance with the invention, there is provided an indicating circuit 32 to visually indicate either that battery 21 is charged or is at that moment receiving charge. When rectifier 23 is conducting and battery 21 is thus charging, lamp 53 is shunted by diode 55 and the entire charging voltage is applied across lamp 59 and parallel resistance 61. Under these conditions, lamp 53 is off and lamp 59 is lit to denote the charging operation. When rectifier 23 is no longer conductive and the battery is substantially fully charged, diode 55 faces an open circuit therefore lamp 53 is placed in series with lamp 59 and its parallel resistance. The impedances of lamp 59 and resistance 61 are so apportioned that during this condition the voltage applied across lamp 59 is insufficient to cause it to light. However, lamp 53 is capable of lighting on this lower applied voltage and thus provides a visual indication that the battery is fully charged. It should be noted that this indicating circuit does not operate on battery power, but rather from energy supplied by the charging circuit.

By way of illustration and in no sense by way of limitation, the following component values have been used in an operative embodiment of the illustrated charger device.

| | |
|---|---|
| Capacitor 17 | 200 microfarads 35 volts. |
| Capacitor 18 | 100 microfarads, 35 volts. |
| Capacitor 67 | 20 microfarads, 20 volts. |
| Resistor 38 | 1000 ohms, 2 watts. |
| Resistor 42 | 3320 ohms. |
| Resistor 43 | 10,000 ohms. |
| Resistor 45 | 560 ohms. |
| Resistor 51 | 0.62 ohm. |
| Resistor 61 | 470 ohms, 1 watt. |
| Resistor 65 | 2200 ohms. |
| Resistor 76 | 68 ohms. |
| Resistor 82 | 100 ohms. |
| Resistor 83 | 650 ohms. |

Thus, there has been described a new and improved battery charging circuit which is capable of very accurately charging a storage battery to a desired energy storage level. The charger is also especially suited for use with portable apparatus which is normally energized from a conventional alternating current power source, but which is operable from a self-contained battery supply. The circuit is in addition rather easy to control even for an unskilled operator and further provides clear visual indication of battery condition.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A device for charging a storage battery from a source of alternating current comprising:

a charging circuit comprising rectifying and filter means, series coupled with said battery, for developing direct current energy from said alternating current source for continuously applying a unidirectional charging current to said battery for at least the terminal portion of any recharge operation;

and a silicon controlled rectifier included in said series charging circuit for passing said continuously applied charging current during said recharge operation and directly responsive solely to the reduction of said charging current below a predetermined amplitude as said battery approaches a fully charged condition for opening said series circuit and terminating charging of said battery, said silicon controlled rectifier having a pair of principal electrodes coupled in said series circuit and a gate electrode responsive to an electrical signal in excess of a predetermined threshold value for triggering said silicon controlled rectifier into conduction, said silicon controlled rectifier becoming thereafter non-conductive only if the electrical current passing between said principal electrodes recedes below said predetermined amplitude, and further comprising sensing means, coupled between said battery and said gate electrode and responsive to the terminal voltage of said battery, for applying an electrical signal to said gate electrode in excess of said predetermined threshold value only when said terminal voltage recedes below a preselected value;

and indicator means shunted across said principal electrodes, said means comprising a series combination of a first indicator bulb and a diode, the common terminal of said bulb and said diode being coupled by further means to one terminal of said battery, said first bulb providing a visual indication when said battery is in a substantially fully charged condition.

2. A battery charging system as described in claim 1 wherein said indicator means additionally includes a second indicator bulb shunted by a resistor, the impedance of said second bulb and said resistor being apportioned such that said resistor effectively shunts said second bulb when said battery is in its charged state and said second bulb assumes a lighted condition only during charging of said battery.

3. A system for charging a storage battery from a source of alternating current to a preselected state of charge comprising:

rectifying means for developing from said alternating current source a unidirectional charging current;

means comprising a gate-electrode-controlled bi-stable switching device having conductive and non-conductive states for applying said unidirectional charging current to said battery, said switching device having a minimum holding current dependent on the bias level of said gate electrode and conduction being established through said device only in response to the application of a triggering signal in excess of a predetermined threshold value to said gate electrode;

triggering means coupled between said storage battery and said gate electrode and responsive to the terminal voltage of said battery for applying a triggering signal in excess of said threshold value to said gate electrode to initiate conduction through said switching device only when said battery terminal voltage recedes below a preselected value;

and means for applying a variable direct current bias to said gate electrode to establish the minimum holding current of said switching device at any desired value within a predetermined range to permit preselection of the level to which said storage battery will be charged.

4. A battery charging system as described in claim 3 wherein said bi-stable switch comprises a silicon controlled rectifier having a pair of principal electrodes serially connected between said rectifying means and said storage battery.

5. A battery charging system as described in claim 3 wherein are included second triggering means for applying a triggering signal in excess of said threshold value to said gate electrode only in response to an initial application of energy from said alternating current source to said rectifying means.

6. A battery charging system as described in claim 5 wherein said second triggering means comprises a capacitor for effectively establishing a transient path of a predetermined low impedance from said rectifying means to said gate electrode only in response to initial application of said alternating current energy to said device.

7. A battery charging system as described in claim 5 wherein are included third triggering means for applying a signal in excess of said threshold value to said gate electrode upon operation of a manually actuated switch.

References Cited

UNITED STATES PATENTS

| | | | |
|---|---|---|---|
| 2,999,969 | 9/1961 | Fritzinger et al. | 320—48 |
| 3,009,091 | 11/1961 | Hallidy | 322—28 |
| 3,106,665 | 10/1963 | Byles | 322—73 |
| 3,157,870 | 11/1964 | Marino et al. | 320—48 X |
| 3,195,033 | 7/1965 | Jones | 323—22 X |
| 3,201,681 | 8/1965 | Van Wilgen et al. | 322—25 |
| 3,305,755 | 2/1967 | Walsh | 320—40 |
| 3,310,729 | 3/1967 | Burgess et al. | 323—22 X |
| 3,321,692 | 5/1967 | Walsh | 320—40 |

LEE T. HIX, *Primary Examiner.*

S. WEINBERG, *Assistant Examiner.*